(12) United States Patent
Kayser

(10) Patent No.: US 9,577,873 B2
(45) Date of Patent: Feb. 21, 2017

(54) METHOD AND A SYSTEM FOR PROVIDING A FLEXIBLE SECONDARY DATA PATH

(71) Applicant: ADVA Optical Networking SE, Martinsried (DE)

(72) Inventor: Kurt Kayser, Wendelstein (DE)

(73) Assignee: ADVA Optical Networking SE, Meiningen (DE)

( * ) Notice: Subject to any disclaimer, the term of this patent is extended or adjusted under 35 U.S.C. 154(b) by 99 days.

(21) Appl. No.: 13/726,077

(22) Filed: Dec. 22, 2012

(65) Prior Publication Data

US 2013/0188478 A1 Jul. 25, 2013

(30) Foreign Application Priority Data

Jan. 24, 2012 (EP) .................................... 12152308

(51) Int. Cl.
| | |
|---|---|
| H04L 12/24 | (2006.01) |
| H04L 12/729 | (2013.01) |
| H04L 12/725 | (2013.01) |
| H04L 12/707 | (2013.01) |
| H04L 12/851 | (2013.01) |
| H04L 12/703 | (2013.01) |
| H04L 12/26 | (2006.01) |
| H04L 12/823 | (2013.01) |

(52) U.S. Cl.
CPC ....... *H04L 41/0668* (2013.01); *H04L 43/0811* (2013.01); *H04L 45/125* (2013.01); *H04L 45/22* (2013.01); *H04L 45/28* (2013.01); *H04L 45/302* (2013.01); *H04L 45/308* (2013.01); *H04L 47/24* (2013.01); *H04L 47/32* (2013.01)

(58) Field of Classification Search
None
See application file for complete search history.

(56) References Cited

U.S. PATENT DOCUMENTS 5,091,902 A * 2/1992 Chopping et al. ............ 370/223
6,542,934 B1 * 4/2003 Bader et al. .................. 709/239
(Continued)

FOREIGN PATENT DOCUMENTS

EP 1562390 A1 8/2005
WO 2008064286 A1 5/2008

OTHER PUBLICATIONS

European Search Report in corresponding European application (i.e., 12152308.8-1249), completed Jun. 20, 2012 (7 pages).
(Continued)

*Primary Examiner* — Hong Cho
(74) *Attorney, Agent, or Firm* — Maginot, Moore & Beck, LLP

(57) ABSTRACT

A method and an apparatus for providing a flexible secondary data path control, said method comprising the steps of: detecting (S1) a primary data path failure of a primary data path between a customer premise site (3) and a central office site (4); initiating (S2) a corresponding secondary data path if a primary data path failure of said primary data path has been detected; initiating (S3) a measurement of data path characteristics of said initiated secondary path or utilizing constantly monitored data path characteristics of paths for an available secondary data path; and determining (S4) services to be provided via said secondary data path depending on the measured data path characteristics of said secondary data path.

13 Claims, 3 Drawing Sheets

(56) References Cited

U.S. PATENT DOCUMENTS

| | | | |
|---|---|---|---|
| 6,643,254 B1* | 11/2003 | Kajitani | H04L 41/06 370/217 |
| 7,370,107 B2* | 5/2008 | Mascolo | 709/225 |
| 7,668,081 B2* | 2/2010 | Hermsmeyer et al. | 370/218 |
| 7,751,326 B2* | 7/2010 | Dunlop et al. | 370/235 |
| 7,995,469 B2* | 8/2011 | Steets et al. | 370/225 |
| 8,427,958 B2* | 4/2013 | Ko et al. | 370/237 |
| 2002/0196802 A1* | 12/2002 | Sakov et al. | 370/432 |
| 2003/0072261 A1 | 4/2003 | Shinagawa | |
| 2003/0133443 A1 | 7/2003 | Klinker et al. | |
| 2006/0088063 A1* | 4/2006 | Hartung et al. | 370/498 |
| 2007/0064594 A1* | 3/2007 | Norton | 370/218 |
| 2009/0046720 A1* | 2/2009 | Streijl et al. | 370/394 |
| 2010/0214911 A1* | 8/2010 | Cooke | H04L 12/66 370/229 |
| 2011/0032817 A1* | 2/2011 | Qian | 370/225 |
| 2011/0090802 A1* | 4/2011 | Kotrla et al. | 370/248 |
| 2011/0268435 A1* | 11/2011 | Mizutani et al. | 398/5 |
| 2011/0292814 A1* | 12/2011 | Sugahara | 370/248 |
| 2012/0017110 A1* | 1/2012 | Omar | 714/2 |

OTHER PUBLICATIONS

Ekelin et al., "Continuous Monitoring of Available Bandwidth over a Network Path", Swedish National Computer Networking Workshop, XP002399913, Nov. 23, 2004 (5 pages).

* cited by examiner

METHOD AND A SYSTEM FOR PROVIDING A FLEXIBLE SECONDARY DATA PATH

This application claims priority under 35 U.S.C. §119 to European patent application no. 12 152 308.8, filed on Jan. 24, 2012, the disclosure of which is incorporated herein by reference in its entirety.

The invention relates to a method and an apparatus for providing a flexible secondary data path and in particular to a flexible backup bandwidth control method used in a network.

BACKGROUND

In many applications the service provider provides a service to a client via a network. The service provider can have a server offering the services via the network to a client connected to the network. The client can be terminal being connected to a customer premise site which in turn is connected to a central office site by means of a primary network infrastructure such as a fiber or wholesale Ethernet. Several office sites can be connected for example via the Internet to the server of the service provider. The primary infrastructure can consist of one or several links. These links can be constituted by a wireless or wired links such as fibers or cables transporting for example data packets and messages bidirectional between the customer premise site and the central office. Consequently, the client is connected via a primary data path to a server of a service provider. This data path may include one or several physical links or generic data transmission circuitry. The data packets transported via the primary infrastructure comprise header and payload and are transported according to a predetermined protocol. For example, the data packets may comprise Ethernet packets which are transported accordingly to an Ethernet based protocol. The data path between a terminal or client device and the entity providing the service can comprise one or more logical and/or physical connections between the two data endpoints having a direct data connectivity. The data exchange between the two data endpoints is transported with a data rate such as a bit-rate or a data packet rate. Since the traffic flow between the data endpoints varies under changing conditions the associated traffic flows must cope with these changes. Changing conditions can cause variable bit or data packet rates transporting the data via the primary infrastructure.

Furthermore, the bit rate between an uplink and a downlink can be asymmetric and have the same or different changing conditions. It can happen that in the primary data path having one or more physical links a link loss occurs, i.e. a physical link may be interrupted. If the data path only has one physical link this link loss causes a complete interruption of the respective data path. If the data path comprises more than one link the interruption of one physical link will change the bandwidth or data rate of the primary data path transporting bidirectional data between the two endpoints. The service provider often has a service level agreement SLA with the customer guaranteeing the customer to receive services at a certain bandwidth or within a certain time limit.

Consequently, when a link loss in the primary data path occurs it is necessary to shift at least a portion of the data traffic which has been transported via the primary data path to at least one other secondary data path which can also include one or more physical and/or logical links. After initiating a secondary data path the provided bandwidth must be sufficient to provide the client device with the desired service according to the service requirements of the service level agreement SLA between the client and the service provider.

Accordingly, there is a need for a mechanism or method which supplies a flexible backup bandwidth control taking into account changing conditions in the network infrastructure.

SUMMARY

This object is achieved by a method providing a flexible secondary data path control comprising the features of claim 1.

Accordingly, the invention relates to a method for providing a flexible secondary data path control, said method comprising the steps of:
a) detecting a primary data path failure of a primary data path between a customer premise site and a central office site;
b) initiating a corresponding secondary data path if a primary data path failure of said primary data path has been detected;
c) initiating a measuring of data path characteristics of said initiated secondary data path or utilizing constantly monitored data path characteristics of an available secondary data path; and
d) determining services to be provided via said secondary data path depending on the measured data path characteristics of the secondary data path.

In a possible embodiment of the method according to the present invention the services to be provided via the secondary data path are determined depending on the measured data path characteristics and predetermined service requirements comprising physical service requirements and/or service requirements of a service level agreement SLA.

In a possible embodiment of the method according to the present invention the measured data path characteristics of the secondary data path comprise at least one data path metric of the secondary data path.

In a possible embodiment of the method according to the present invention the data path metric of the secondary data path comprises a signal quality, a bit error rate, a frame error rate, a usable data rate, a signal propagation delay, signal delay variations and/or a signal latency of data packets or signals transported via the secondary data path.

In a further possible embodiment of the method according to the present invention the services comprise services of different flow types having corresponding service requirements with respect to a data path failure handling.

In a further possible embodiment of the method according to the present invention the services comprise as services of a first flow type real time services of highest priority, for which a switching or shifting of data traffic from the primary data path to the secondary data path is performed under all circumstances independently from the measured data path characteristics.

In a further possible embodiment of the method according to the present invention the services comprise as services of a second flow type high priority services for which a switching or a shifting of data traffic from the primary data path to the secondary data path is performed if the measured data path metric of the secondary data path indicates that the bandwidth of the secondary data path is sufficient for the required service.

In a further possible embodiment of the method according to the present invention the services comprise as services of a third flow type best effort services of medium priority for which a switching or shifting of data traffic from the primary data path to said secondary data path is performed if more than a predetermined portion of the headroom is left.

In a further possible embodiment of the method according to the present invention the services comprise as services of a fourth flow type best effort services of low priority for which no switching or shifting of data traffic from the primary data path to the secondary data path is performed.

In a further possible embodiment of the method according to the present invention all available data paths are tested in configurable regular time intervals or constantly to detect path changes or path failures of the respective data path.

In a further possible embodiment of the method according to the present invention the data path characteristics of an available secondary data path are notified by the customer premise site to at least one client connected to the customer premise site if a primary data path failure of the primary data path used by the client is detected.

The invention further provides a system comprising the features of claim 11.

The invention relates to a system for providing a flexible secondary data path control, said system comprising:
a) at least one primary data path between a customer premise site and a central office site;
b) a data path failure detection unit adapted to detect a primary data path failure of said primary data path and to initiate a corresponding secondary data path if a primary data path failure of the primary data path has been detected; and
c) a control unit adapted to measure data path characteristics of the initiated secondary data path or to utilize constantly monitored data path characteristics of an available secondary data path and to determine services to be provided via the secondary data path depending on the measured data path characteristics.

In a possible embodiment of the system according to the present invention the primary data path comprises a bidirectional data path having at least one physical or logical link between the customer premise site and the central office site through which data traffic for different services comprising different flow types are transported.

In a further possible embodiment of the system according to the present invention the secondary data path comprises different backup infrastructures with corresponding different data path metrics.

In a possible embodiment of the system according to the present invention the backup infrastructures of the secondary data path comprise a wireless network infrastructure including a CDMA, GSM EDGE, UMTS, LTE or WIMAX.

In a further possible embodiment of the system according to the present invention the backup infrastructures of the secondary data path comprise a wired infrastructure, in particular a copper line based infrastructure comprising an ADSL, VDSL or DOCSIS connection.

In a further possible embodiment of the system according to the present invention the backup infrastructures of the secondary data path comprise a microwave based connection.

In a further possible embodiment of the system according to the present invention the backup infrastructures of the secondary data path can comprise a satellite based connection.

In a further possible embodiment of the system according to the present invention the backup infrastructures of the secondary data path can comprise a glass fiber based connection.

In a further possible embodiment of the system according to the present invention the data path characteristics of the backup infrastructure include usable data path characteristics of the secondary data path which are variable over time and are measured in regular time intervals by said control unit using test data, wherein the test data traffic does not impair a data transport capability of the secondary data path during the measurement of the data path characteristics.

BRIEF DESCRIPTION OF THE FIGURES

In the following possible embodiments of the method and system for providing a flexible secondary data path control are described with reference to the enclosed figures in more detail.

DETAILED DESCRIPTION

Figure 1:
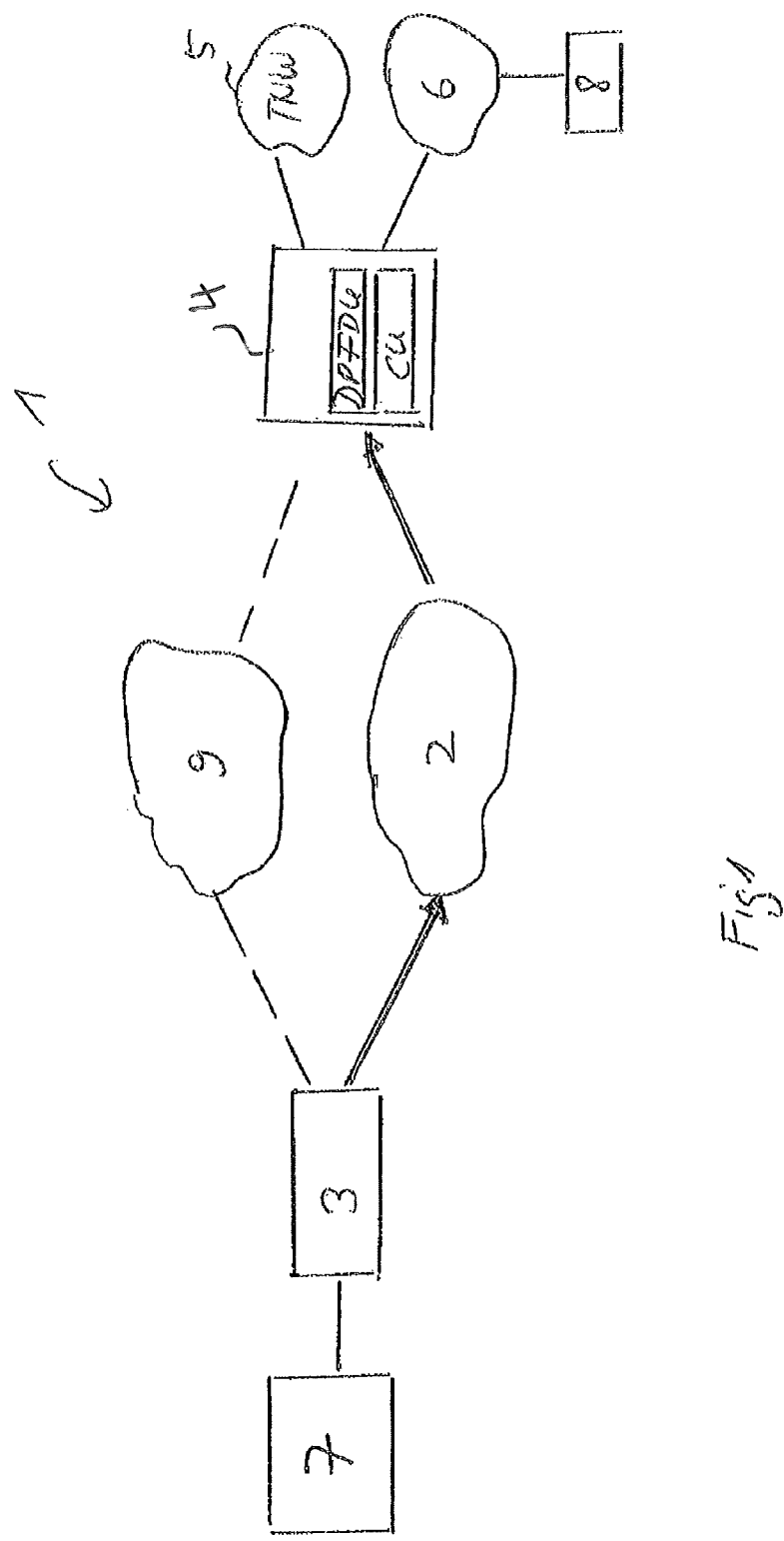
FIG. 1 shows a diagram for illustrating an exemplary embodiment of a system for providing a flexible secondary data path control according to the present invention.

As can be seen from FIG. 1 a system 1 for providing a flexible secondary data path control comprises at least one primary data path 2 between a customer premise site 3 and a central office site 4. The primary data path 2 can be formed by a primary network infrastructure, for example a fiber network or an Ethernet network. The central office site 4 can comprise an Edge node backup controller. The central office site can be connected to one or several public of private networks, for example a telephone network 5 or a data network such as the Internet 6. The customer site 3 can comprise one or several client ports to which clients or terminals of users 7 can be connected. The client 7 can be provided with a service by a service provider having a server connected to the Internet 6 via the primary data path over the primary network infrastructure 2 as shown in FIG. 1. The communications between the client 7 and the server 8 can be bidirectional wherein the data traffic can be transported in a data traffic flow changing depending on changes affecting the primary network infrastructure 2. The primary data path can comprise one or several physical and/or logical links connecting the customer site 3 via the primary network infrastructure 2 to the central office site 4. The data flow of the data traffic can be a continuous data flow or can consist of data packets transported via the primary network infrastructure 2. The services provided to the client 7 can comprise services of different flow types. Between the client 7 and the service provider of the server 8 a service level agreement SLA can exist which guarantees the client 7 that it will receive a specific service from the service provider with a predetermined quality and within a predetermined time. If at least one link of the primary data path is affected by changing conditions such that the bandwidth of the transported data traffic is diminished it becomes necessary to shift at least a portion of the transported data traffic from the primary data path to at least one link of a secondary data path in a backup link operation. In the shown exemplary embodiment of FIG. 1 the system 1 comprises a secondary backup network infrastructure 9 to which data traffic can be shifted if the bandwidth of at least one link within the primary data path via the primary network infrastructure 2 is diminished.

The secondary backup infrastructure 9 of the system 1 can comprise a wireless network infrastructure including for example a CDMA, GSM, EDGE, UMTS, LTE or WIMAX network. The wireless network such as CDMA can handle 0.3-4.9 Mbps downlink and 0.15-1.8 Mbps uplink of data traffic. GSM EDGE data link can handle 0.4-1.9 Mbps downlink and 0.4-1 Mbps uplink data traffic bandwidth. Further, UMTSW-CDMA/HSUPA can handle 0.38-14.4 Mbps downlink and 0.38-5.7 Mbps uplink data traffic bandwidth whereas UMTSW-CDMA/HSUPA+ has a capacity of 42 Mbps downlink and 22 Mbps uplink. The LTE backup infrastructure has a broad bandwidth of 326.4 Mbps downlink and 86.4 Mbps uplink. A WIMAX infrastructure has a bandwidth capacity of 70 Mbps downlink and 70 Mbps uplink.

Instead of a wireless network infrastructure the secondary backup infrastructure 9 can also comprise a wired, in particular copper line based infrastructure comprising for example ADSL, VDSL or DOCSIS connection. ADSL has for example a capacity of 1.5-6.1 Mbps downlink and 0.016-640 Kbps for the uplink connection. VDSL has a capacity of 12.9-52.8 Mbps downlink and 1.5-2.3 Mbps uplink. Other infrastructures can also be used for the backup network infrastructure 9 such as a microwave based connection, a satellite based connection and/or a glass fiber based connection. A microwave based connection can cause typically odd bit rates with standard interfaces such as 100/1000 Mbps. A satellite based connection can offer a stable bandwidth, however, with some odd bit rates such as 512 Kbps.

The data transmission rates and bit rates of the links can vary depending on the distance between the sites and depending on whether other users share the same infrastructure. It is possible to group some links together to bundles to increase bandwidth such as nxDSL lines or MIMO. Accordingly, the backup links of the backup network infrastructure 9 can offer non-constant, non-predictable bit rates and even asymmetric bit rates for the uplink and downlink connection. These variable data rates or bit rates demand a flexible adjustment and the associated data traffic flow has to cope with these data rate changes.

Figure 2:
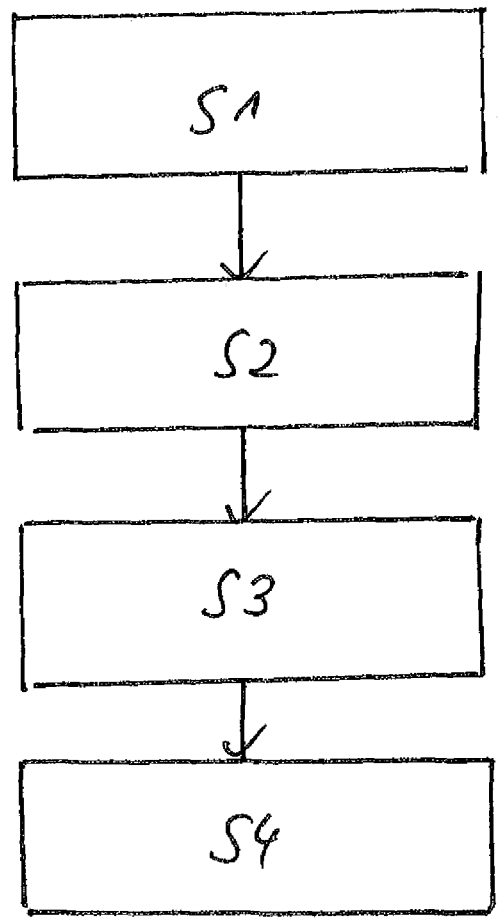
FIG. 2 shows a flow chart of a possible embodiment of a method for providing a flexible secondary data path control according to the present invention.

FIG. 2 shows a flow chart of a possible embodiment of a method for providing a flexible secondary data path control according to the present invention.

In a first step S1 a primary data path failure of a primary data path 2 between the customer premise site 3 and the central office site 4 is detected. For example, a link loss of a data link within the primary network infrastructure 2 can be detected causing a data path failure between the client 7 and the service provider. A data path failure can be caused by a complete loss of a physical link within the primary data path 2 or by a degraded link with a diminished data rate or bandwidth affecting the service provided to the client 7 negatively so that a requirement of the service level agreement SLA might no longer be fulfilled. A data path failure can be detected by a data path failure detection unit being adapted to detect a primary data path failure within the primary data path 2 and to initiate a corresponding secondary data path 9 if the primary data path failure has been detected. In a possible embodiment this data path failure detection unit DPFDU can be provided within the central office site 4 as shown in FIG. 1. In a possible further implementation also the customer site 3 can comprise such data path failure detection unit DPFDU. In a further possible embodiment the data path failure detection unit DPFDU can also be formed by a unit within the primary data path infrastructure 2 notifying either the customer site 3 and/or the central office site 4 via a still working physical link of the primary data path 2 of the occurred data path failure.

After the primary data path failure has been detected a corresponding secondary data path 9 is initiated in step S2.

In a further step S3 the measurement of the data path characteristics of the initiated secondary data path 9 is initiated. The characteristics of an available secondary data path is utilized which have been constantly monitored. In a possible embodiment the measurement of the data path characteristics or link characteristics is performed after a failure has been detected in the primary data path 2. Further, it is possible that stand-by links or stand-by data paths of a secondary data path 9 are monitored on an ongoing basis even before a failure has been detected and to use this information data for the further processing.

In a further step S4 services to be provided via a secondary data path are determined depending on the measured data path 9 characteristics of the secondary data path. In a possible embodiment of the system 1 according to the present invention a control unit cu is provided which is adapted to measure data path characteristics of an initiated secondary data path 9 or to utilize a data path characteristic of an available secondary data path 9 which has been monitored constantly in the path before the failure has been detected. This control unit cu can be further adapted to determine services to be provided via the secondary data path depending on the measured data path characteristics. This control unit CU can in a possible implementation be provided within the central office site 4 as shown in FIG. 1. In a further possible embodiment the customer site 3 can also comprise such a control unit CU.

The method as shown in FIG. 2 can be executed by an application program run on a processor which can be provided within the customer site 3 and/or within the central office site 4 as shown in FIG. 1. In a possible embodiment of the method according to the present invention the services to be provided via the secondary data path 9 are determined in step S4 depending on the measured data path characteristics and predetermined service requirements of the respective service. These predetermined service requirements can comprise physical service requirements and also service requirements of a service level agreement SLA between the user of the client device 7 and the service provider of the respective service.

In a further possible embodiment of the method according to the present invention the measured data path characteristics of the secondary data path 9 can comprise at least one data path metric of the secondary data path. This data path metric can comprise a signal quality, a bit error rate, a frame or packet error rate, a usable data rate, a signal propagation delay, signal delay variations and a signal latency of data packets or signals transported via the respective secondary data path.

The services provided by the service provider to the client 7 can comprise services of different flow types comprising corresponding service requirements with respect to a data path failure handling.

The services can comprise as services of a first flow type real time services of highest priority which must be protected under all circumstances such as Voice over IP VOIP. For these services of the first flow type a switching or shifting of data traffic from the primary data path 2 to the secondary data path 9 is performed independently from the measured data path characteristics under all circumstances.

The services can further comprise as services of a second flow type high priority services which may be protected or backed up if the current data throughput allows this. For the services of the second flow type a switching or shifting of data traffic from the primary data path 2 to the secondary data path 9 is performed if a measured data path metric of the secondary data path 9 indicates that the bandwidth of the secondary data path 9 is sufficient for the required service.

The services can comprise as services of a third flow type best effort services of medium priority which need not to be protected or backed up, for example if less than X-% of a headroom is left between a maximum throughput. For the services of the third flow type a switching or shifting of data traffic from the primary data path 2 to the secondary data path 9 is performed if more than a predetermined portion of the headroom is left.

The services can further comprise as services of a fourth flow type best effort services of low priority where no backup at any time is provided. For services of the fourth flow type no shifting or switching from the primary data path to the secondary data path is performed even when a failure in the primary data path is detected.

With the method according to the present invention it is possible that all available data paths are tested in configurable regular time intervals to detect path changes or path failures within the data path. Further, it is possible that available data paths are tested constantly to detect path changes or path failures within the data paths. It is possible that data path characteristics of available secondary data paths are notified by the customer premise site 3 to at least one client 7 connected to the customer premise site 3 if a primary data path failure of the primary data path 2 used by the respective client 7 has been detected. In a possible implementation an application running on the client 7 can decide whether a shift or a switching to a secondary data path will be performed or not. A shifting or switching can be performed in a possible implementation according to a predetermined policy indicating for instance which kind of secondary backup infrastructure 9 is preferred in case that a failure occurs in the primary data path 2. In a possible embodiment the data path characteristics of the backup infrastructure 9 including a usable data path characteristic of an available secondary data path can be variable over time and can be measured in regular time intervals via a control unit CU using test data wherein the test data traffic does not impair a data transport capability of the secondary data path 9 during the measurement of the data path characteristic. Accordingly, a link remains usable to transport or buffer data during a test so that the link can remain available for rapid movement or shift of services from a primary data path to a secondary data path in case of a link failure in the primary data path 2. The measurement of a data path or at least a link of the data path using test data traffic does not impair or harm user or service traffic. Test traffic can comprise a configurable priority or precedence when compared to other traffic flow types. The primary data path and the secondary data path can form two different wide area network WAN connections. For example, the primary data path 2 can form a main link within a predetermined link speed of 10, 100 or 1000 Mbps. There can be backup WANs with different link speeds which are used only if the main link is no longer available.

Figure 3:
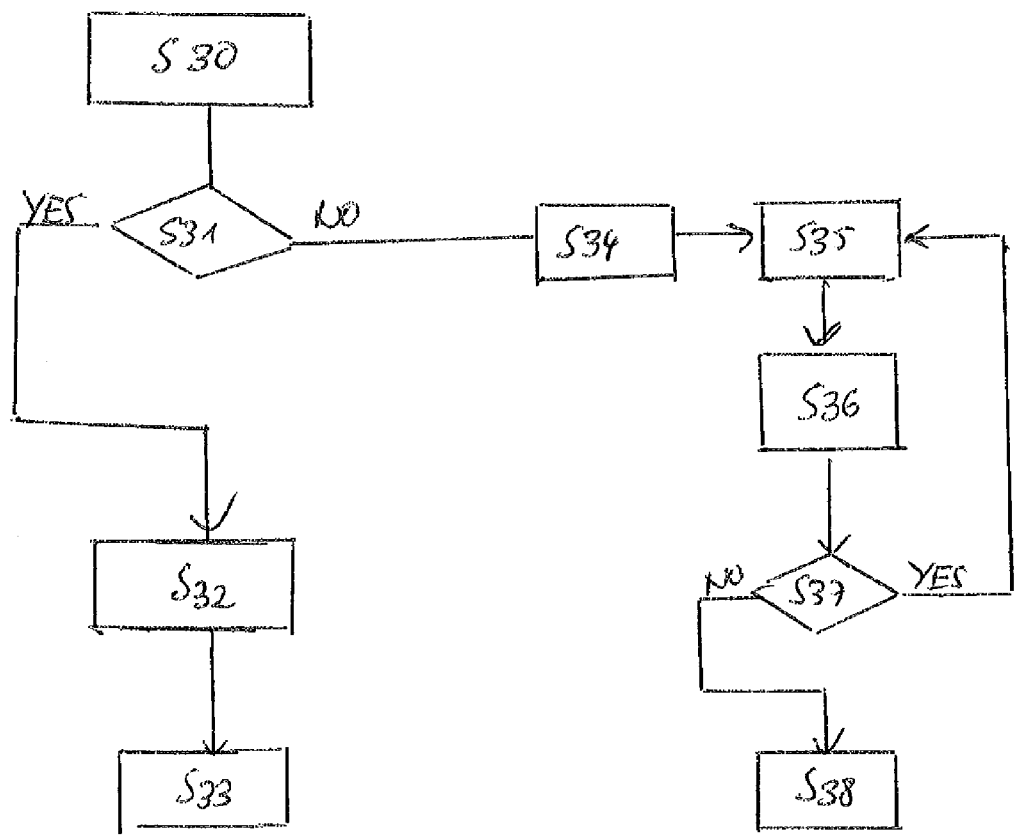
FIG. 3 shows a further flow chart illustrating a possible implementation of a method for providing a flexible secondary data path according to the present invention.

FIG. 3 shows a flow chart for a backup bandwidth state diagram to illustrate a possible implementation of the method according to the present invention. After a step S30 it is checked in step S31 whether the main link or primary data path is ok and offers its corresponding bandwidth for the data traffic of a service. If the main link is ok an optional WAN bandwidth parameter is applied to all traffic flows in step S32 and the process ends in step S33. On the contrary, if the main link is not ok the backup link or secondary data path is initiated in step S34 as shown in FIG. 3. In a further step S35 the initiated backup link is tested to check what usable data throughput it can offer in step S35. In a further step S36 the WAN usable bandwidth parameter is applied for services of the different flow types. In a further step S37 a cyclic retest of the link throughput is performed in regular time intervals as shown in FIG. 3. The secondary data path or backup link is used until the main link or primary data path returns to a normal operation state in step S38 as shown in FIG. 3.

In a possible embodiment the usable bandwidth of a link or data path is discovered to decide whether a service can be provided using said link or data path. In a possible embodiment test data traffic is sent with increasing bandwidth to a remote device or node which reports back to the transmitting node the received bandwidth until a data loss will occur. After a data loss has been detected by the transmitting node this limit represents a current available throughput bandwidth of the link or data path through which the test data traffic has been sent and may be used to set data traffic flow parameters, accordingly. This detection and dynamic adjustment of the flow parameters can greatly increase the use of various secondary backup network infrastructures. In a possible embodiment the test traffic measures the bandwidth of a data link to conform to a common standard such as CFM-ETH-TST data packets. The payload of these data packets can carry information about the current sending status of the sending node. In this case, the receiving node can always compare if less bandwidth has been received than the sending node reported to have transmit into the backup links. The data traffic is sent with increasing bandwidth until a drop/loss limit is reached and this limit is then reported back by the receiving node to the data stream originator or sending node to define a current existing bandwidth and data speed limit of the investigated link.

In a possible embodiment the data flow behavior can be adjusted according to the discovered bandwidth values of the respective link. For example, data flows having a low priority can be interrupted temporarily. Further, it is possible to raise an alarm about too high bandwidth requirements for the existing backup link capabilities of the investigated backup or secondary link.

In a possible embodiment test data traffic is sent periodically via the respective link to check if the bandwidth capacity of the link has changed in the meantime. For example, data traffic can be sent each hour within short bursts or time intervals.

In a possible embodiment the evaluation of the bandwidth of a data path or link can be performed in a discovery and reporting procedure performed between the customer premise site 3 and the central office site 4 as shown in FIG. 1. In a possible implementation the customer premise site 3 initializes a backup port for bandwidth testing. The customer premise site 3 can request a test partner or remote node for a test procedure being unidirectional or bidirectional. The EDGE node or customer office site 4 can accept the test partner's status and accept the proposed test procedure and can send this information back to the customer premise site 3.

The customer premise site 3 then sends a test data stream with increasing bandwidth with a current data rate report as payload. The EDGE node or central office site 4 monitors the received data rate and compares the received data rate versus the signal data rate and can report this back to the test partner.

The customer premise site 3 further can request a remote test and the central office site 4 sends increasing data traffic wherein the current transmitting data rate is reported as payload. The customer premise site 3 can then report data loss thresholds for both directions and adjust data flows according to maximum possible data rates. Further, the customer premise site 3 can report this as test partner results. The remote EDGE node or central office site 4 can receive active flow parameters to ensure a symmetrical data flow handling.

Further, the customer premise site 3 as well as the central office site 4 can then start sending data traffic for active data flows which match the detected parameter limits. In this way, data rates and changes can be discovered or detected during a backup link operation. The derived data and information can be used to utilize the backup more efficiently. The method and system according to the present invention allows to switch or at least partially shift data from a primary data path or secondary data path in case that the bandwidth of the primary data path 2 is reduced so that the physical service requirements and/or the service requirements of a service level agreement SLA are fulfilled at all times.

What is claimed is:

1. A method for providing a flexible secondary data path control, said method comprising the steps of:
    a) detecting a primary data path failure of a primary data path between a customer premise site and a central office site;
    b) initiating a corresponding secondary data path if a primary data path failure of said primary data path has been detected;
    c) proceeding with at least one of:
        initiating a measurement of data path characteristics of said initiated secondary path, and
        utilizing constantly monitored data path characteristics of paths for an available secondary data path; and
    d) determining services to be provided via said secondary data path depending on the measured data path characteristics of said secondary data path,
    wherein secondary links of a backup network infrastructure offer non-constant, non-predictable bit rates and asymmetric bit rates for an uplink and downlink connection, and said non-constant, non-predictable bit rates and asymmetric bit rates demand a flexible adjustment and an associated data traffic flow to cope with these data rate changes, and
    wherein said primary data path and said secondary data path are tested constantly to detect path changes or path failures of said primary data path and secondary data path, and
    wherein the measurement of the primary data path and said secondary data path does not impair or harm user traffic or service traffic, and
    wherein the secondary data path is used until the primary data path returns to a normal operation state,
    wherein said secondary data path includes different backup infrastructures with corresponding different path metrics; and
    wherein said backup infrastructures of said secondary data path comprises a wireless network infrastructure including a CDMA, GSM EDGE, UMTS, LTE or WIMAX network and/or a microwave-based connection and/or a satellite-based connection.

2. The method according to claim 1, wherein the services to be provided via said secondary data path are determined depending on the measured data path characteristics and predetermined service requirements comprising at least one of physical service requirements and service requirements of a service level agreement (SLA).

3. The method according to claim 1, wherein the measured data path characteristics of said secondary data path comprise at least one usable data path metric of said secondary data path, wherein said data path metric comprises a signal quality, a bit error rate, a frame error rate, a usable data rate, a signal propagation delay, signal delay variations and a signal latency of data packets or signals transported via the secondary data path.

4. The method according to claim 1, wherein said services comprise services of different flow types comprising corresponding service requirements with respect to data path failure handling.

5. The method according to claim 4, wherein said services comprise as services of a first flow type real time services of highest priority, for which a switching or shifting of data traffic from the primary data path to said secondary data path is performed independently from the measured data path characteristics.

6. The method according to claim 4, wherein said services comprise as services of a second flow type high priority services for which a switching or shifting of data traffic from the primary data path to said secondary data path is performed if the measured data path metric of said secondary data path indicates that the bandwidth of the secondary data path is sufficient for the required service.

7. The method according to claim 4, wherein said services comprise as services of a third flow type best effort services of medium priority for which a switching or shifting of data traffic from the primary data path to said secondary data path is performed if more than a pre-determined portion of a headroom is left.

8. The method according to claim 4, wherein said services comprise as services of a fourth flow type best effort services of low priority for which no switching or shifting of data traffic from the primary data path to said secondary data path is performed.

9. The method according to claim 1, wherein data path characteristics of an available secondary data path are notified by said customer premise site to at least one client connected to said customer premise site if a primary data path failure of said primary data path used by said client is detected.

10. A system for providing a flexible secondary data path control, said system comprising:
    at least one primary data path between a customer premise site and a central office site;
    a data path failure detection unit (DPFDU) adapted to detect a primary data path failure of said primary data path and to initiate a corresponding secondary data path if a primary data path failure of said primary data path has been detected; and
    a control unit (CU) adapted to perform at least one of:
        measure data path characteristics of said initiated secondary data path; and
        utilize constantly monitored data path characteristics of an available secondary data path; and
        the control unit further configured to determine services to be provided via said secondary data path depending on the measured data path characteristics,
    wherein secondary links of a backup network infrastructure offer non-constant, non-predictable bit rates and asymmetric bit rates for an uplink and downlink connection, and said non-constant, non-predictable bit rates and asymmetric bit rates demand a flexible adjustment and an associated data traffic flow to cope with these data rate changes,.

wherein said primary data path and said secondary data path are tested constantly to detect path changes or path failures of said primary data path and secondary data path, wherein the measurement of the primary data path and said secondary data path does not impair or harm user or service traffic, and wherein the secondary data path is used until the primary data path returns to a normal operation state, wherein said secondary data path includes different backup infrastructures with corresponding different path metrics; and wherein said backup infrastructures of said secondary data path comprises a wireless network infrastructure including a CDMA, GSM EDGE, UMTS, LTE or WIMAX network and/or a microwave-based connection and/or a satellite-based connection.

11. The system according to claim 10, wherein said primary data path comprises a bidirectional data path having at least one physical or logical link between said customer premise site and said central office site through which data traffic for different services comprising different flow types are transported.

12. The system according to claim 10, wherein said backup infrastructures of said secondary data path comprise a copper line based infrastructure comprising an ADSL, VDSL or DOCSIS connection.

13. The system according to claim 12, wherein the data path characteristics of said backup infrastructure including a usable data path characteristic of said secondary data path are variable over time.

* * * * *